(12) United States Patent
Shive et al.

(10) Patent No.: US 8,191,916 B1
(45) Date of Patent: Jun. 5, 2012

(54) VERSATILE TRAILER HITCH CONFIGURATION FOR VEHICLE RESTRAINT

(76) Inventors: Lorne Christopher Shive, Memphis, TN (US); Eric Bradley Gore, Mathiston, MS (US)

( * ) Notice: Subject to any disclaimer, the term of this patent is extended or adjusted under 35 U.S.C. 154(b) by 0 days.

(21) Appl. No.: 12/961,164

(22) Filed: Dec. 6, 2010

(51) Int. Cl.
*B60D 1/06* (2006.01)
*B60P 7/08* (2006.01)

(52) U.S. Cl. .............................. 280/511; 410/7; 280/402

(58) Field of Classification Search ................... 280/402, 280/656, 511; 410/7
See application file for complete search history.

(56) References Cited

U.S. PATENT DOCUMENTS

| | | | | |
|---|---|---|---|---|
| 4,580,935 A | * | 4/1986 | Treihaft | 410/3 |
| 4,671,713 A | * | 6/1987 | Lenkman | 410/7 |
| 5,749,685 A | * | 5/1998 | Hain | 410/7 |
| 6,036,417 A | * | 3/2000 | Weaver | 410/7 |
| 6,050,737 A | * | 4/2000 | Russell | 403/43 |
| 6,139,235 A | * | 10/2000 | Vander Koy et al. | 410/111 |
| 6,382,891 B1 | * | 5/2002 | Bellis, Jr. | 410/7 |
| 7,077,004 B2 | * | 7/2006 | Mitter | 73/335.04 |
| 2008/0247836 A1 | * | 10/2008 | Erb et al. | 410/7 |

* cited by examiner

*Primary Examiner* — Tony Winner
(74) *Attorney, Agent, or Firm* — Wyatt, Tarrant & Combs, LLP; William S. Parks

(57) ABSTRACT

An improved manner of attaching, restraining, and securing a vehicle onto a trailer through a versatile hitch configuration. Such a configuration permits utilization of at least one hitch coupler assembly for releasable attachment/connection to a selected vehicle with a complementary component for connection therewith. Additionally, the coupler assembly is present on a trailer through a temporary or permanent base connector configuration that includes a removable crossbar through which the coupler assembly is threaded to allow for movement around said crossbar as well as along the length of said crossbar simultaneously. The crossbar may also be adjusted height wise within the base connector through placement and securing within graduated openings within the connector itself. Further designs utilizing the base movable hitch coupler concept, as well as entire trailers and methods of transporting vehicles with such a device, are also encompassed within this invention.

20 Claims, 3 Drawing Sheets

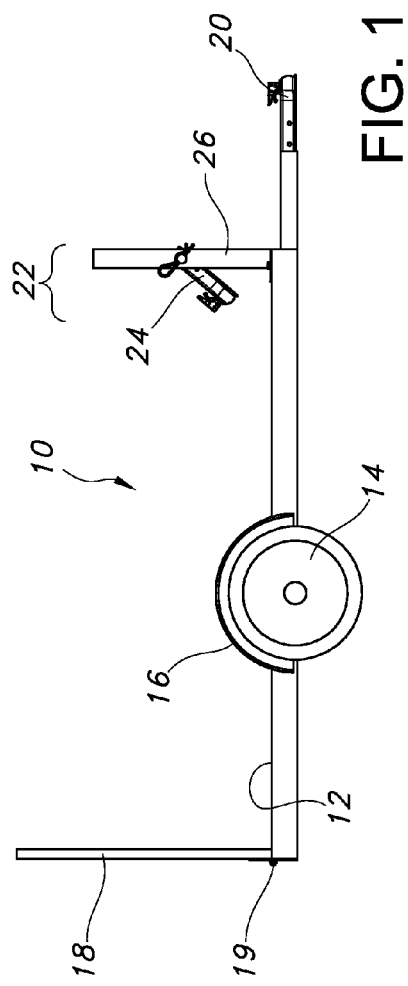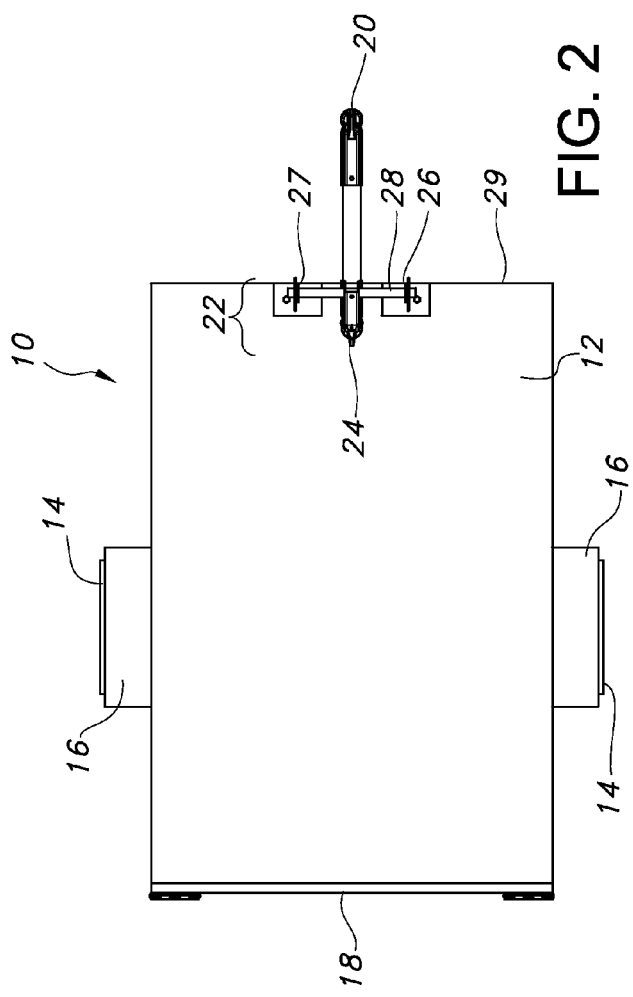

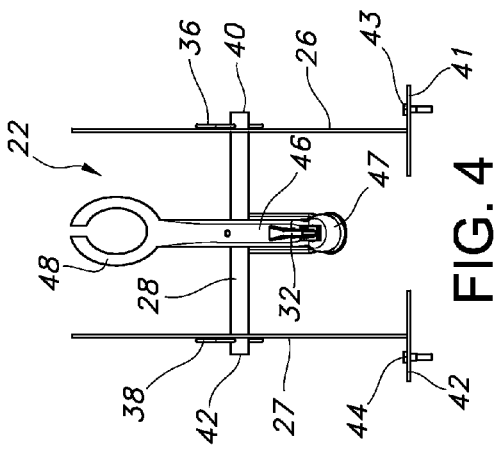
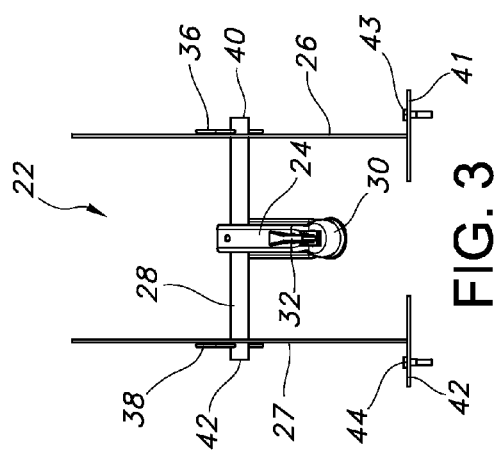
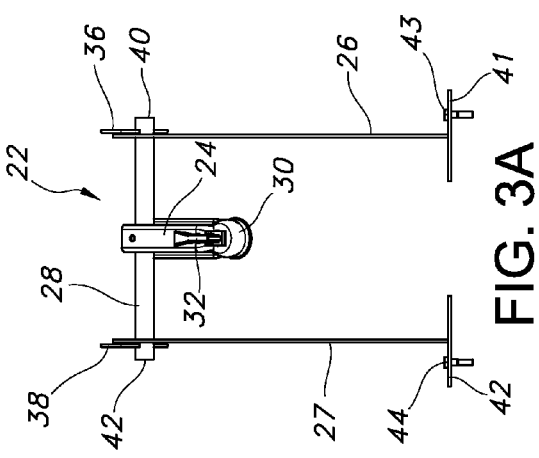

VERSATILE TRAILER HITCH CONFIGURATION FOR VEHICLE RESTRAINT

FIELD OF THE INVENTION

The present invention relates to an improved manner of attaching, restraining, and securing a vehicle onto a trailer through a versatile hitch configuration. Such a configuration permits utilization of at least one hitch coupler assembly for releasable attachment/connection to a selected vehicle with a complementary component for connection therewith. Additionally, the coupler assembly is present on a trailer through a temporary or permanent base connector configuration that includes a removable crossbar through which the coupler assembly is threaded to allow for movement around said crossbar as well as along the length of said crossbar simultaneously. The crossbar may also be adjusted height wise within the base connector through placement and securing within graduated openings within the connector itself. Such an overall design permits a trailer hitch that may be releasably attached to a selected vehicle at any desired height and at a range of locations on the target trailer itself. Through the movable capabilities of the hitch configuration, and specifically the different locations at which the coupler assembly may be releasable attached to the target vehicle, this overall trailer hitch facilitates transport of target vehicles through permitting omission of specific alignment requirements with a permanently and immovable hitch coupler, as well as any further need for extra security means (such as bungee cords, strong fiber straps, and the like) to properly and reliably attach the target vehicle for proper transport. Further designs utilizing the base movable hitch coupler concept, as well as entire trailers and methods of transporting vehicles with such a device, are also encompassed within this invention.

BACKGROUND OF THE PRIOR ART

Many vehicles and/or landscaping machines are utilized in locations that are a significant distance from one's place of residence. For instance, off-road vehicles, such as all-terrain vehicles (ATV) and motocross motorcycles, as merely examples, as well as riding lawnmowers and golf carts, again, as merely examples, are enjoyed and/or used in such a fashion. Such off-road vehicles are typically recreational and are not usually permitted on public roadways. As well, riding lawnmowers and golf carts, and the like, are primarily used for work purposes and are not suitable for roadway driving, either. As such, ordinary circumstances have dictated that a user of either type of vehicle must transport such devices to and from one's place of residence to the desired location for recreational or work use. As such, again, in typical fashion, the user will utilize a trailer or truck bed for such transportation with the target vehicle properly attached thereto in some fashion to allow for secured transportation thereof. Additionally, however, such target vehicles are subjected to possible jostling and other undesirable jarring movements during transportation, particularly when positioned on a trailer including inflatable tires and/or suspect suspension systems, such that the vehicle itself may be susceptible to detachment from a rigid coupler assembly present within the trailer hitch connecting the subject vehicle to the transporting trailer. This undesirable movement may cause the subject transported vehicle to detach and thus potentially fall from the trailer itself. To compensate for such a possibility, typical users include straps to further secure the subject vehicle to the base trailer structure. Although such additional items may provide greater security in terms of unwanted vehicle movement, unfortunately, the implementation of such straps is time-consuming and, with a relatively heavy subject vehicle in place requiring further secured tie-down, the straps themselves must exhibit a significant tensile strength inherently to accord the needed resiliency to overcome any coupler assembly detachment during transport, particularly when the transporting trailer is traveling at high speeds over highways or maneuvering rough terrain itself (as examples). Likewise, such straps, cords, ropes, etc., must also be utilized properly in terms of user involvement in wrapping, applying, and tightening such items for resultant reliable connections as well. As such, user error (through lack of proper application, etc., such as doing so at too quick a pace, for instance) may complicate rather than properly thwart any possible coupler assembly detachment occurrences. Hence, although such strap use is a typical manner of providing such extra security to transported vehicles, their utilization is frowned upon due to the time and care required for proper and reliable use to take place.

Furthermore, such standard hitch devices require proper alignment with the connecting component located on the target vehicle. If the vehicle is brought into even a slightly skewed alignment in such a situation, the user runs the risk of the rigid hitch attachment displacing due to jostling or other like results during transport. Detachment may lead to catastrophic failure of the hitch attachment, which may lead to unwanted movement of the vehicle from the trailer hitch altogether. Alternatively, the user may need to realign the target vehicle in such a manner, thus requiring multiple attempts at proper attachment in such a manner. Such a potential time-consuming, and still questionable alignment result, is inefficient and potential unsafe as it is. One manner of correcting for such an issue is the utilization of a winch to bring the target vehicle in direct and proper alignment with the hitch assembly. Although such a device may be more reliable than simply maneuvering a target vehicle manually into alignment, such a device requires further manpower and time to attach and ensure the target vehicle itself remains proper directed until close enough to attach to the hitch assembly in question. To date, however, there have been no trailer hitch devices that allowed for manual alignment with substantially universal reliability in proper alignment between the target vehicle connector and the target hitch assembly itself.

Past trailer hitch device and assembly improvements have included add-on structures to the rear portions of trailers with braces that connect with portions of a target vehicle to prevent roll-back possibilities during use. Examples include U.S. Patent Application Publication No. 2008/0247836, to Erb et al., and U.S. Pat. No. 7,588,401, to Latham. Additionally, other devices include add-on assemblies to the front portions of trailers that include differing connection means for securing wheels or other target components in place during transportation, such as in U.S. Pat. No. 7,077,004 to Denman, Jr. Similar prior art devices that include such rigid assemblies for hitch connections include U.S. Pat. Nos. 6,050,737 to Russell, 4,671,713 to Lenkman, 6,139,235 to Vander Koy et al., 4,580,935 to Treihaft, 6,382,891 to Bellis, Jr., 5,749,685 to Hain, and 6,036,417 to Weaver. No devices have been provided, however, that compensate for the rigors of travel over rough terrain or potentially harsh roadways such that bumps and potholes are taken into effect in terms of the potential for detachment from a rigid connection device, as well as exhibiting versatility in terms of connection heights. As such, the prior art assemblies are all directed to rigid devices that are not designed to move in response to any bumps, etc., to permit some degree of movement relative to imperfect roadways incurred during transport. Likewise, the state of the art trailer hitches do not permit, as well, alignment of the target vehicle at more than one point along a perpendicular axis from the direction of the direction of the vehicle itself during alignment and attachment therewith. In other words, the prior art trailer hitch assemblies permit one single point of attachment along such an axis which, as alluded to above, may create difficulties and inefficiencies to the user through the need to realign the target vehicle properly to that single axis point. Although some devices, such as that provided in the Denman, Jr., patent listed above, may allow for vertical variability in terms of connection points for a subject vehicle, there are no devices that permit both horizontal and vertical versatility along those lines.

Lastly, the prior art devices are all directed to trailer hitch assemblies that exhibit a single type of available connection component for a subject vehicle (such as a ball joint capture means complementary to a ball joint extension present on such a target vehicle). With the potential for multiple vehicle types that may be transported at different times, or perhaps simultaneously, the lack of multiple connection devices, either of the same structure, or of different configurations, limit the potential utility of such standard trailer hitches. Hence, there is much left in this specific area of art to provide users with trailer hitches of greater versatility and better reliability, simultaneously. To date, however, and unfortunately, the types of hitch assemblies available to such a person are extremely limited.

ADVANTAGES AND BRIEF SUMMARY OF THE INVENTION

On distinct advantage of the present development is the capability of providing a hitch assembly connection point along a range of different horizontal points to compensate for possible misalignment of a target vehicle. Another advantage of this development is the ability to raise or lower the hitch assembly to a suitable height for maximum connection reliability with a target vehicle. Yet another advantage of this development is the ability of the hitch assembly to compensate, when connected with a target vehicle, for jarring movements during transport. Another advantage of this hitch assembly is the facilitation of connection between the trailer hitch and the target vehicle for reliable transport without any need for further added straps, ropes, cords, or the like, as supplemental restraints. Still another advantage of this trailer hitch assembly is the availability of multiple connection types within a single assembly, or, alternatively, multiple connection assemblies along the same horizontal axis to permit multiple vehicle transport on a single trailer.

Accordingly, this invention encompasses a trailer for the transport of at least vehicle, said trailer including at least one substantially flat surface on which said vehicle is situated during transport, at least two wheels, and at least one trailer hitch assembly, wherein said assembly includes at least one substantially horizontal crossbar situated between two end plates and present in a plane above the plane of said substantially flat surface, wherein said crossbar is further more configured in a position substantially perpendicular to the direction in which said at least two wheels are configured; wherein said trailer hitch assembly further includes at least one coupler component with a least portion thereof configured in a shape and format complementary in shape and size to at least a portion of said vehicle such that upon proper alignment and interaction between said portion of said hitch assembly and said portion of said vehicle, said vehicle will become releasably attached to said trailer hitch assembly; wherein said coupler component includes at least two openings that are complementary in shape with said crossbar to permit threading of said crossbar through said openings, thereby permitting said coupler component, when not attached with said vehicle, to move along said horizontal crossbar within the space between said two end plates and to rotate freely around the crossbar axis. Further add-on components to and different configurations of said trailer hitch assembly are encompassed within this development, as well as the trailer hitch assembly defined in such a manner itself and methods of transporting vehicles with such a trailer and/or trailer hitch assembly, too.

The transport trailer is generally connected itself through a typical trailer hitch assembly to a larger vehicle (car, truck, or the like) (the transport vehicle) that provides the necessary power and movement to transport the desired vehicle placed on top of the trailer itself. The inventive trailer hitch assembly is situated on the end of the transport trailer that is closest to the transport vehicle hitch assembly, thus facilitating securing of the to-be-transported vehicle through driving or otherwise moving the connection end (i.e., that end of the vehicle on which the extended portion for connection with the trailer hitch assembly) is present. Thus, the transported vehicle can be moved in such a fashion to the connection point at the front end of the trailer. In practice, the transported vehicle may then be attached (releasably) to the trailer hitch assembly and an emergency brake may be applied as the sole supplemental restraint needed for securing the vehicle during transport. The freedom of movement of the hitch coupler component around and along the axis of the crossbar accords the ability to attach the transported vehicle at any point along the crossbar axis while simultaneously permitting the coupler and the vehicle to move in relation to rough terrain or other typical roadway obstacles (i.e., potholes, and the like) without jeopardizing to any appreciable degree the resiliency and robustness of the connection between the trailer hitch and the transported vehicle. As such, the resultant hitch assembly accords a highly surprising effective means of reliably attaching a transported vehicle onto a subject trailer without any need to specifically direct the vehicle to a specific point for trailer hitch connection to commence. Additionally, the weight and stability of the transported vehicle will accord the needed stationary status of the transported vehicle during transport to prevent and side-to-side movements of the coupler component along the crossbar axis. Thus, a very safe and reliable trailer hitch assembly is provided through this inventive development. Further configurations and alternatives are described in greater detail below in relation to the versatility of such a base development and structure.

BRIEF DESCRIPTION OF THE DRAWINGS

FIG. 1 depicts a side view of an inventive trailer with the trailer hitch assembly included therein.

FIG. 2 depicts an overhead aerial view of the inventive trailer of FIG. 1.

FIG. 3 depicts one potentially preferred embodiment of the inventive trailer hitch assembly from a head on perspective. FIG. 3A depicts the same trailer hitch with the crossbar raised to a greater height along the end plates.

FIG. 4 depicts another potentially preferred embodiment of the inventive trailer hitch assembly from a head on perspective with two different connection devices included within a single coupler component.

FIG. 5 depicts a different embodiment of the inventive trailer hitch from a head on perspective wherein the height of the coupler is adjustable at the rotation point and the crossbar is stationary. FIG. 5A shows the same embodiment as in FIG. 5 but from a side view perspective.

DETAILED DESCRIBED OF THE INVENTION, PREFERRED EMBODIMENTS, AND DRAWINGS

Figure 6:
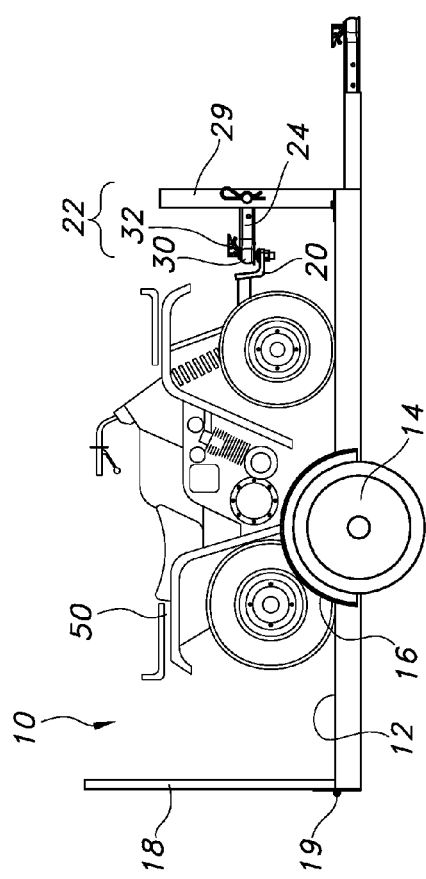
FIG. 6 depicts an inventive trailer with the trailer hitch assembly of FIG. 3 attached to an all-terrain vehicle.

The inventive trailer hitch assembly, as noted above, requires a crossbar present at a location elevated above the plane of the substantially flat portion of the subject trailer and perpendicularly situated in relation to the direction the trailer itself is to move during transport. Such a crossbar is, in essence, a substantially cylindrically shaped rod or pipe, being solid or hollow and made from sufficiently strong and resilient material, such as steel, brass, stainless steel, aluminum, and the like. Such a crossbar is elevated through insertion (if removable and adjustable to a higher or lower elevation) through eyeholes within two parallel end plates or through permanent attachment to two parallel end plates (if the crossbar is intended to remain in place and not be adjustable). In either case, the crossbar may run along a portion of the front border of the trailer for any distance up to the length of the entire front border itself. Thus, with trailers of this sort typically measuring about six feet in width (about the width of a typical traffic lane less 1½ feet on either side), the maximum length of the crossbar may be 6 feet as well. The crossbar assembly, however, may be configured to run a length of only 9 inches at its shortest length. Any length within that range may be suitable, with about 18 inches to 24 inches preferably preferred, As well, if the length of the crossbar is less than the entire length of the front border of the subject trailer, then the crossbar assembly portion is preferably centered along the length of the trailer front border, as well. Likewise, in order to ensure stability of the crossbar along a length that exceeds the 24 inch preferred length, further lifting reinforcements may be included to prevent sagging of the crossbar over time. Such reinforcements may be spaced evenly along the crossbar length for such a purpose and may either exist as pedestals for resting the crossbar upon (again, if the crossbar is removable and adjustable height wise), or such reinforcements may be permanent in attachment (such as through soldering, as one example) along the crossbar length. In any event, the crossbar is of great importance to permit movement of at least one coupler component of the subject trailer hitch assembly both along and around the crossbar axis.

As noted above, the crossbar itself may be removable and adjustable to allow for height modifications for the hitch assembly in order to compensate for differing configurations and connections possibilities present on a subject transported (or, more succinctly, prior to attachment, to-be-transported) vehicle. To that end, the end plates utilized to secure the crossbar into place, as well as to provide limits on the distance the coupler component may move along the crossbar axis, include eyeholes for the insertion of the subject crossbar with one crossbar end inserted within one end plate and the other crossbar end inserted within a similarly aligned eyehole (at least present at substantially the same height in relation to the plane of the substantially flat portion of the subject trailer itself). The crossbar length, as alluded to above, should match roughly the distance between the two end plate structures, or, alternatively, be slightly longer than such a distance, to permit such insertion and subsequent securing of a movement prevention means thereto the crossbar to prevent unwanted movement from such an eyehole threaded position. The crossbar may be secured through any standard means, such as a strong pin inserted through holes bored into the ends of the crossbar and configured to be long and strong enough to prevent lateral movement of the crossbar, particularly during vehicle transport and attachment and connection of the coupler component and the complementarily shaped and sized connection portion of the to-be-transported vehicle. With at least two different sets of eyeholes present within the subject end plates (and exhibiting, as above, the same appreciable height above the trailer flat portion plane) all having the proper bore to permit crossbar end entry and securing through, as merely one example, utilization of a metal pin through each crossbar end (as noted above), then the crossbar may be adjusted to at least two different heights to accommodate different transported vehicle heights as needed.

Alternatively, the coupler may be adjustable in height without any need to move the crossbar. This may be accomplished through the inclusion of a height adjustable means directly to the coupler itself. In such a manner, an attachment including openings to permit entry of the crossbar is provided to which the height adjustable means is releasably attached. Similarly to the crossbar discussion above, openings are provided within this height adjustable means at graduated levels to permit a smaller crossbar to be inserted and held in place at differing heights. Such a smaller crossbar then inserts within opening within the coupler to thus allow for height adjustments separate from any need to adjust the trailer hitch crossbar height.

The coupler component itself, as discussed previously, includes bored holes through which the same crossbar may be threaded. As such, the coupler component may be a single device of proper material (again, such as steel, stainless steel, aluminum, brass, and the like) that can withstand the movement and related stresses associated with vehicle hitching and rough terrain or other undesirable jarring effects during transport, without losing its overall strength and capability to secure a large transported vehicle. Such a component will include at least one connection device therein that is complementary in size and shape to a typical extension present on a subject transported vehicle. For example, a typical ball joint extension may be present on the subject vehicle which thus would require a proper ball joint latch device present within the coupler component of the hitch assembly. In this manner, the coupler component may be maneuvered over the ball joint extension with subsequent actuation of the latch itself in order to provide a secure connection between the hitch assembly and the transported vehicle.

As noted above, such a ball joint and complementary latch device are non-limiting examples of the overall design for this inventive hitch assembly. Any variation of a typical or at least possible connection assembly device for this purpose may be utilized. As such, the coupler component of the inventive hitch assembly may be of any such configuration, as long as it is present in threaded relation along the axis of the crossbar portion thereof.

The rotational capability of the coupler component around the crossbar lends itself to several benefits and advantages as well. The first, as discussed above, pertains to the capability of the connection between the hitch assembly and the transported vehicle to withstand the rigors and jarring movements associated with high speed and/or rough terrain driving. In essence, the slight movement permitted through such rotational potential around the crossbar axis imparts sufficient movement to overcome such jarring and jostling (basically acting as a default suspension system for the connection itself), thus providing a reliable and robust connection for such a purpose. Likewise, the threaded coupler component may be maneuvered anywhere along the crossbar longitudinal axis to permit connection between the transported vehicle and the hitch assembly at any point along such an axis. As noted above, this allows for, at least, quicker, yet reliable, connections to be made between the hitch and the vehicle.

Additionally, however, the threaded coupler component/crossbar configuration allows for further advantages as well. For instance, the coupler component may be configured itself to include more than one connection device type therein, with each extra device present in a different region of the overall component, but radiating out from the threaded portion thereof (that being, in essence, the central location of the coupler component). Thus, for instance, a ball joint latch device may be present in one region of the coupler component, and a claw latch device (to capture and secure a motorcycle wheel, for instance) may be present in a different coupler component region. The user may then have the choice to rotate the coupler component to the selected connection device type prior to connection with the transport vehicle. With two different connection devices, the two types may be present, in one possible embodiment, in substantially 180 degrees relation from one another. If a third connection device is included, then each portion may be 120 degrees from one another (again, roughly). In such a situation, however, the trailer itself should be configured to allow for proper and complete rotation of the coupler component by including a proper cut-out within the substantially flat portion thereof.

Furthermore, with the possibility of a crossbar of sufficient length to measure as long as the width of the trailer itself, multiple coupler components may be present as well, with multiple connection devices included therein, as noted above, in order to permit attachment with multiple transport vehicles, if desired by the user. Some vehicles, such as ATVs and like-sized types, would most likely not permit more than one such vehicle to be transported at one time However, motorcycles, bicycles, golf carts, lawn mowers, and like smaller and thinner vehicles, may be ripe for multi-transport arrangements. With multiple coupler components available to that extent, such a design would facilitate such a multiple vehicle configuration and transport possibility. As well, with reinforcements possibly in place within a crossbar configuration that runs greater than 24 inches along the front border of the subject trailer, the multiple coupler component possibilities may also be placed individually within the sequestered areas created by the reinforcements themselves. In any event, the versatility of the hitch assembly design including the base concept of the crossbar and threaded coupler component is rather large in possible permutations.

The drawings included herein are for the purpose of illustrating the invention and are not intended to be limiting nor to scale. FIG. 1 thus provides a view of the inventive trailer 10 including a substantially flat vehicle bed 12 (which may be of any construction, including a solid metal or wooden sheet, or connected metal or wooden sheets, or a lattice work of metal, as non-limiting examples), two wheels 14 (the other is shown as 15 in FIG. 2) (although any number of wheels may be utilized as long as proper balance and safe transport is permitted), wheel guards 16 (other is 17 in FIG. 2), rear rotatable rear gate 18 (that may function as a ramp for moving the target vehicle, such as 122 in FIGS. 5 and 6) with a hinge 19, and its own connection extension 20 for attachment to a towing vehicle (not illustrated) (the trailer 10 may also include side rails or walls of any type, such as solid steel pipes or slats, or further metal lattice structures, as merely examples, neither of such rails or walls provided in illustration, that may provide protection to prevent vehicle placed thereon the bed 12 from sliding laterally off the bed itself, if desired). Also included on this inventive trailer 10 is the inventive trailer hitch assembly 22 including a coupler component 24, two end plates 26 (second shown in FIG. 2 as 27) and a crossbar (in FIG. 2 as 28). Thus, in FIG. 2, the overhead view shows the inventive hitch assembly 22 with the coupler component 24 threaded through the crossbar 28 with limits on movement of the coupler component 24 provided by the two end plates 26, 27. The hitch assembly 22 is attached to the trailer 10 at the front border 29 of the trailer 10 to provide effective space for introduction and attachment of a vehicle (50 of FIG. 5, for example), as well.

FIG. 3 provides a closer view of the inventive hitch assembly 22 including the coupler component 24, in this embodiment present with a standard ball joint connection device 30 and a latch 32 to secure such a connection upon placement over a ball joint extension (as shown as 140 in FIG. 5, for example) and subsequent actuation of the latch 32. The coupler component 24 is threaded through the crossbar 28 which itself is secured into place by two pins 36, 38, inserted through holes (not illustrated) within the crossbar 28 at either end thereof 40, 42. The crossbar 28 extends through holes within end plates 26, 27, thus permitting threading of the crossbar 28 therethrough with the pins 36, 38 providing the prevention of further movement of the crossbar 28. In such a manner, the crossbar 28 may be removed and adjusted to a different height, as well. FIG. 3A provides such a possibility as the crossbar 28 has been raised to a set of higher aligned eyeholes (not illustrated) present within the end plates 26, 27. If desired, however, the crossbar 28 may be set at a specific height and integrated into the end plates 26, 27 permanently, as an alternative, potentially preferred embodiment. Additionally, the inventive hitch assembly 22 in total may be added on to a trailer (10 in FIG. 1, for example) through the utilization of bottom plates 41, 42 and connection means 43, 44 introduced through aligned holes (not illustrated) on the trailer (10 of FIG. 1) and the bottom plates 41, 42. Alternatively, however, as above with the crossbar 28, the hitch assembly 22 may be permanently attached to the trailer 10, rather than releasably attached, and may be attached to a raised portion of the trailer 10, rather than directly attached to the bed 12. Such attachment may be through adhesive, solder, screw mechanisms, nails, and the like, or any combination thereof.

The coupler component 24, as discussed above, is preferably a single connection device. However, if desired, the coupler 24 may be configured to include a plurality of different connection devices within a single coupler 24. FIG. 4 shows a two-headed coupler 46 including a standard ball joint connection device portion 47 and a tightened clamp device portion 48, wherein the selection of use of the device itself is permitted through rotation of the coupler 46 around the crossbar 28. Any typical type of connection device may be utilized in such an instance, including clevis types, clamp types, crampons, and the like, as long as a proper and dimensionally stable connection device may be produced in this manner and included within a hitch assembly coupler 46. It should be noted, however, that any individual type of connection device may be configured to be any typical vehicle connection device and utilized as a stand-alone coupler (as in FIGS. 3 and 3A, for instance), rather than such a stand-alone type being a ball joint connection device alone. Likewise, multiple coupler components may be provided and introduced along the crossbar through threading (and thus such coupler components will include properly sized and aligned eyeholes for such a possible purpose), thereby providing a plurality of coupler components for utilization simultaneously or at different times. In such an instance, such multiple coupler components may be stand-alone types or those including multiple devices within single couplers (as in FIG. 4). In essence, there is no limit to the possible permutations of available configurations of coupler components in this manner. The coupler component 46 of FIG. 4 is depicted with the two different connection devices present 180 degrees (roughly) from one another, thus to allow for freedom of use of one while the other does not impede such use. If three devices are included in a single coupler component, as discussed above, an arrangement of devices roughly 120 degrees separated from one another, and radiating from the eyeholes of the coupler component itself, would be preferred, though not required. Feasibly, four such devices would be configured in rough 90 degrees separations, likewise, if desired by the user.

As noted above, the crossbar (28 of FIGS. 3 and 3A, at least) may be adjustable in terms of height. Alternatively, however, the crossbar may be stationary and, if desired, the coupler 30 may be independently adjusted in such a manner. FIGS. 5 and 5A provide one potential embodiment providing such an adjustable coupler 30 wherein the coupler 30 is releasably attached to a hollowed post 130 including graduated openings 132 parallel to each other and on the external portions 134, 136 of the post 130. Through the utilization of a short crossbar 138 that inserts through one post external portion 134 through similarly shaped openings in the coupler (not illustrated) and through the other post external portion 136, with pins or like means to secure the short crossbar 138 in place, the coupler 30 may be secured. By adjusting to different graduated parallel openings in the post 130, the coupler 30 may then be adjusted to differing heights. The post 130 is attached (releasably or permanently) to a channeled component 140 that includes a bore through which the hitch crossbar 28 may be inserted. Thus, the overall hitch assembly 22 retains its freedom of movement along and around the crossbar 28 with this alternative embodiment.

Figure 8:
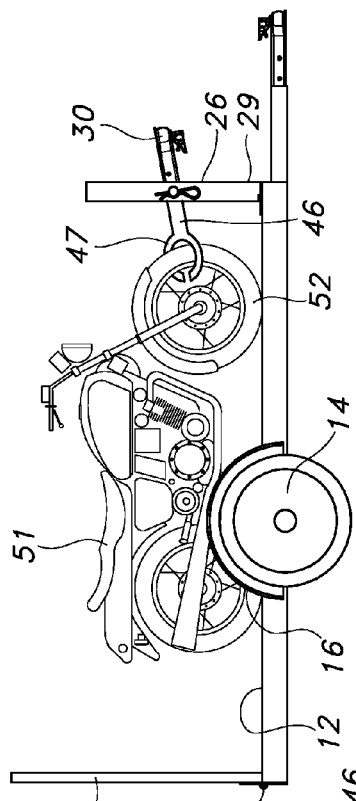
FIG. 8 depicts an inventive trailer with the trailer hitch assembly of FIG. 4 attached to a motorcycle via a clamp device.
Figure 7:
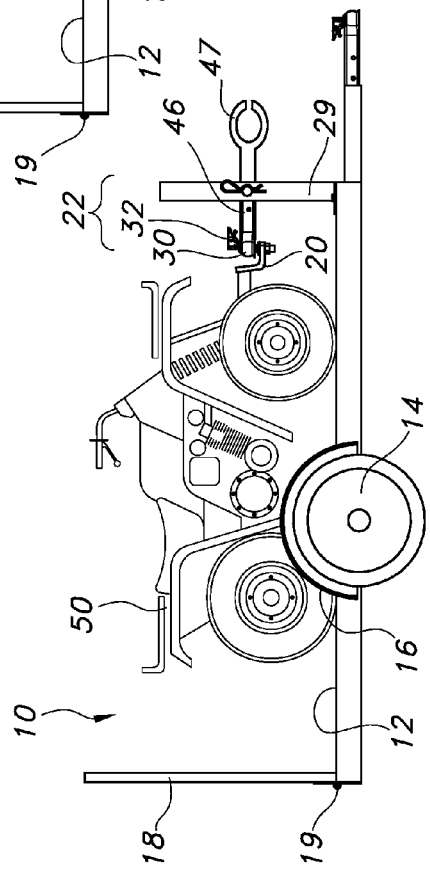
FIG. 7 depicts an inventive trailer with the trailer hitch assembly of FIG. 4 attached to an all-terrain vehicle via a ball joint.

In actual utilization, then, the trailer hitch assembly of FIG. 3 (24) may be attached, as in FIG. 6, to the extension ball joint present on a transported vehicle (such as an all-terrain vehicle) 50. The vehicle 50 is situated on the vehicle bed 12 with the rear gate 18 locked into a vertical position (to prevent, if necessary, rollback). The trailer hitch assembly coupler component 24 includes the proper ball joint connection device 30 and a latch 32 that has captured and locked into place the ball joint extension 20, thus securing the vehicle 50 for transport on the trailer 10. In this potential embodiment, the coupler is attached to a raised portion 129 of the trailer 10 and secured through the hitch assembly plates 26 thereto. FIG. 7 thus shows the same basic utilization of an inventive trailer hitch assembly, albeit with the multi-connection device of FIG. 4 and with the hitch assembly 22 attached to the front border 29 of the trailer 10 to allow not only for the attachment of the end plates 26, 27 of the hitch assembly 22 to the trailer bed 12, but also to permit full rotation of the multi-device coupler component 46 around the axis of the crossbar 28 for full movement of the coupler 46 to either desired location. The same basic result of effective securing of the vehicle 50 is accorded with a standard ball joint 20. The clamp device 47 of the inventive hitch assembly 122 is utilized in FIG. 8 wherein a motorcycle 60 is secured. Thus, the capability and versatility of the inventive hitch assembly 122 is shown as the mere rotation of the coupler 46 provides alternative securing means without compromising on performance or safety. In this situation, the clamp device portion 47 of the coupler 46 attaches to a motorcycle 51 at the front wheel 52. As described above, this is but one possible embodiment of the inventive trailer and trailer hitch assembly as multiple parallel clamp devices may be utilized simultaneously to transport multiple motorcycles (or like vehicles) securely and safely on the same trailer utilizing the inventive devices. Again, as well, the removable crossbar 28 embodiment of the invention would permit introduction and removal of different coupler components as desired by the user for any such purpose. Overall, the entire assembly permits and facilitates connection and attachment of vehicles for transport on a properly configured trailer. The versatility of the overall design and function is shown through the ability to utilize different connection devices on demand, potential to tailor the height of the connection device to comport with the specifics of the target transported vehicle, as well as allow for ease in alignment of the connection devices along the axis of the crossbar component, too. Lastly, the rotational aspect of the connection device around such an axis permits reactivity to rough terrain or other roadway obstacles (bumps, potholes, and the like) during transport, thus making the connection with the transported vehicle highly reliable and eminently safe. No problems have ever been found with such a device in use.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A trailer for the transport of at least one vehicle, said trailer including a substantially flat surface on which said at least one vehicle is situated during transport, said substantially flat surface including a front border; at least two wheels; a connection assembly for connection to a towing vehicle; and at least one trailer hitch assembly; wherein said connection assembly extends outwardly and perpendicularly from said front border of said trailer; wherein said at least one trailer hitch assembly is present at said front border of said substantially flat surface; wherein said at least one trailer hitch assembly includes at least one substantially horizontal crossbar situated between two end plates and present in a plane above the plane of said substantially flat surface, wherein said at least one crossbar is configured in a position substantially perpendicular to a direction in which said at least two wheels are configured; wherein said at least one trailer hitch assembly further includes at least one coupler component with at least a portion thereof configured in a shape and format complementary in shape and size to at least a portion of said at least one vehicle such that upon proper alignment and interaction between said at least portion of said at least one trailer hitch assembly and said at least portion of said vehicle, said at least one vehicle is releasably attached to said at least one trailer hitch assembly; wherein said at least one coupler component includes at least two openings that are complementary in shape with said at least one crossbar to permit threading of said at least one crossbar through said openings, thereby permitting said at least one coupler component, when not attached with said at least one vehicle, to move along said at least one horizontal crossbar within the space between said two end plates and to rotate freely around a crossbar axis.

2. The trailer of claim 1 wherein said trailer hitch assembly includes at least two coupler components present along said at least one crossbar.

3. The trailer of claim 2 wherein said at least two coupler components are included on the same coupler structure such that access for releasable attachment to said vehicle is available for one coupler component at a time and that such access is permitted through rotation of said coupler structure around said at least one crossbar.

4. The trailer of claim 3 wherein said at least one crossbar is permanently attached to said end plates.

5. The trailer of claim 3 wherein said end plates include openings for introduction of said at least one crossbar and securing means to retain said at least one crossbar in place.

6. The trailer of claim 5 wherein said end plates include openings therein at differing heights to allow for height adjustment of said at least one crossbar.

7. The trailer of claim 2 wherein said at least one crossbar is permanently attached to said end plates.

8. The trailer of claim 2 wherein said end plates include openings for introduction of said at least one crossbar and securing means to retain said at least one crossbar in place.

9. The trailer of claim 8 wherein said end plates include openings therein at differing heights to allow for height adjustment of said at least one crossbar.

10. The trailer of claim 1 wherein said end plates include openings for introduction of said at least one crossbar and securing means to retain said at least one crossbar in place.

11. The trailer of claim 10 wherein said end plates include openings therein at differing heights to allow for height adjustment of said at least one crossbar.

12. The trailer of claim 1 wherein said at least one coupler component includes height adjustment means.

13. The trailer of claim 12 wherein said at least one crossbar is permanently attached to said end plates.

14. The trailer of claim 1 wherein said trailer includes a rotatable gate present on an end opposite that of said front border.

15. The trailer of claim 1 wherein said at least one crossbar is permanently attached to said end plates.

16. A trailer hitch assembly that may be attached securely to a trailer, wherein said assembly includes at least one substantially horizontal crossbar, two end plates, at least two coupler components with at least a portion of each of said at least two coupler components configured in a shape and format complementary in shape and size to at least a portion of a vehicle such that upon proper alignment and interaction between one of said at least two coupler components of said hitch assembly and said portion of said vehicle, said vehicle will become releasably attached to one of said at least coupler components, and means to attach said trailer hitch assembly to a substantially flat surface;
  wherein said two end plates are configured in parallel relation to one another;
  wherein said at least one horizontal crossbar is attached to both of said two end plates simultaneously;
  wherein said at least two coupler components includes openings that are complementary in shape with said at least one crossbar to permit threading of said at least one crossbar through said openings, thereby permitting said at least two coupler components to move along said at least one horizontal crossbar within the space between said two end plates and to rotate freely around a crossbar axis.

17. The trailer hitch assembly of claim 16 wherein said at least two coupler components are included on a same coupler structure such that access for releasable attachment to said vehicle is available for one of said at least two coupler components at a time and that such access is permitted through rotation of said coupler structure around said at least one crossbar.

18. The trailer hitch assembly of claim 16 wherein said at least one crossbar is permanently attached to said end plates.

19. The trailer hitch assembly of claim 16 wherein said end plates include openings for introduction of said at least one crossbar and securing means to retain said at least one crossbar in place.

20. The trailer hitch assembly of claim 19 wherein said end plates include openings therein at differing heights to allow for height adjustment of said at least one crossbar.

* * * * *